US012508740B1

(12) United States Patent
Walsworth

(10) Patent No.: US 12,508,740 B1
(45) Date of Patent: Dec. 30, 2025

(54) MODULAR CONCRETE PRODUCTION SYSTEM AND METHOD

(71) Applicant: CementCo Technology, LLC, Spanish Fort, AL (US)

(72) Inventor: Telly Walsworth, Spanish Fort, AL (US)

( * ) Notice: Subject to any disclaimer, the term of this patent is extended or adjusted under 35 U.S.C. 154(b) by 887 days.

(21) Appl. No.: 17/685,928

(22) Filed: Mar. 3, 2022

(51) Int. Cl.
*B28C 9/04* (2006.01)
*B28C 5/12* (2006.01)
(Continued)

(52) U.S. Cl.
CPC .......... *B28C 9/0454* (2013.01); *B28C 5/1253* (2013.01); *B28C 5/143* (2013.01); *B28C 7/067* (2013.01); *B28C 7/10* (2013.01)

(58) Field of Classification Search
CPC ....... B28C 5/06; B28C 5/0875; B28C 7/0418; B28C 7/163; B28C 5/1215; B28C 7/0413; B28C 5/0893; B28C 5/1238; B28C 5/16; B28C 7/02; B28C 5/08; B28C 5/0806; B28C 5/1253; B28C 9/0454; B28C 5/0818; B28C 9/006; B28C 9/0481; B28C 5/146; B28C 7/06; B28C 5/143; B28C 7/067; B28C 7/10; E04G 21/025; E04G 21/0436; E04G 21/10; B01F 5/0473; B01F 5/048; B01F 5/0611; B01F 5/0618; B01F 2005/0091; B01F 2005/0636; B01F 25/3141; B01F 25/31423; B01F 25/4311; B01F 25/4316; B01F 25/431971; B01F 2025/931; B01F 35/2202; B01F 23/53; B01F 2035/99; B01F 35/00; B01F 35/20; B01F 35/2111; B28B 1/16;
(Continued)

(56) References Cited

U.S. PATENT DOCUMENTS 3,251,484 A * 5/1966 Hagan .................. B28C 7/0495 414/21
4,406,548 A * 9/1983 Haws .................... B28C 9/0463 366/8
(Continued)

FOREIGN PATENT DOCUMENTS

CN 119897952 A * 4/2025 .............. B07B 1/28
WO 2011/021074 A1 2/2011
WO 2021/183174 A1 9/2021

OTHER PUBLICATIONS

International Search Report, mailed Oct. 13, 2020 for Appl. No. PCT/US20/43906, filed Jul. 28, 2020, to Walsworth, Telly.
(Continued)

*Primary Examiner* — Charles Cooley

(57) ABSTRACT

A modular concrete production system includes individual units for the production of concrete that may be individually transported to a construction site and set up for on-site concrete production. The system includes a portable concrete mixing unit, a portable power supply unit, and a portable water supply unit. The system also includes modular bins for cement and aggregate. The bins are pre-loaded with cement and aggregate off-site and then transported to the work site for use. The bins can be stacked onto hoppers to supply cement and aggregate to a concrete mixer on the concrete mixing unit and then replaced when the contents of the bins are depleted to operate the mixer continuously.

18 Claims, 11 Drawing Sheets

(51) Int. Cl.
*B28C 5/14* (2006.01)
*B28C 7/06* (2006.01)
*B28C 7/10* (2006.01)

(58) Field of Classification Search
CPC ....... C04B 2111/00146; C04B 40/0028; E04F 21/24; E04F 15/12; E04F 21/08; E04F 21/248; E04F 21/02; B29C 67/242; Y02W 30/91; B66C 23/04
USPC .................................. 366/11, 35, 37, 64–66
See application file for complete search history.

(56) References Cited

U.S. PATENT DOCUMENTS 4,548,507 A * 10/1985 Mathis ...................... B28C 9/00 366/186
4,768,884 A * 9/1988 Elkin ........................ B29B 9/04 366/50
4,922,463 A * 5/1990 Del Zotto ............. B28C 9/0463 366/186
5,044,819 A * 9/1991 Kilheffer ................ G01G 19/08 366/156.1
5,303,998 A * 4/1994 Whitlatch ............... B01F 33/80 222/394
5,590,976 A * 1/1997 Kilheffer ................ G01G 19/08 366/8
5,624,183 A * 4/1997 Schuff ....................... B28C 7/06 366/35
5,785,420 A * 7/1998 Schuff ..................... B28C 5/142 366/35
5,873,653 A * 2/1999 Paetzold ............... B01F 35/832 366/35
7,320,539 B2 * 1/2008 Christenson ............ B01F 27/62 366/14
9,731,255 B2 * 8/2017 Black ....................... B01F 33/84
9,738,461 B2 * 8/2017 DeGaray ............... B28C 7/0038
9,951,535 B2 * 4/2018 Degaray ................. B28C 7/044
10,286,573 B2 * 5/2019 Cunningham ............ B28C 7/02
2003/0002384 A1 1/2003 Flood
2003/0142579 A1 7/2003 Throop
2007/0226089 A1 9/2007 Garay et al.
2012/0205400 A1 * 8/2012 Degaray ................... B28C 7/02 222/192
2012/0230147 A1 9/2012 Heller et al.
2013/0025706 A1 * 1/2013 Degaray ............... B28C 7/0422 406/108
2013/0199617 A1 * 8/2013 Degaray ............... B28C 7/0038 137/1
2013/0265843 A1 10/2013 Matye
2014/0355372 A1 * 12/2014 Black .................... B01F 35/881 366/8
2015/0165393 A1 * 6/2015 Schuster ................... B28C 7/12 366/1
2017/0021529 A1 * 1/2017 Cunningham .......... B28C 7/044
2017/0369258 A1 * 12/2017 Degaray ............... B28C 9/0454
2018/0347214 A1 * 12/2018 Degaray ................. B28C 7/044
2021/0229322 A1 * 7/2021 Johnson ................ B28C 9/0409
2021/0332584 A1 * 10/2021 Johnson ................ E04B 1/3483
2022/0297346 A1 * 9/2022 Johnson ................ B28C 5/0818
2022/0402167 A1 12/2022 Walsworth

OTHER PUBLICATIONS

Written Opinion of the International Searching Authority, mailed Oct. 13, 2020 for Appl. No. PCT/US20/43906, filed Jul. 28, 2020, to Walsworth, Telly.
U.S. National Stage U.S. Appl. No. 17/416,366 of PCT Appl. No. PCT/US20/43906, filed Jun. 18, 2021, to Walsworth, Telly.
Non-final Office Action mailed Jan. 11, 2023 for U.S. Appl. No. 17/416,366, filed Jun. 18, 2021, to Walsworth.

* cited by examiner

MODULAR CONCRETE PRODUCTION SYSTEM AND METHOD

FIELD OF THE DISCLOSURE

The subject matter of the present disclosure refers generally to a modular concrete production system and a method of using the system to produce concrete.

BACKGROUND

The production of concrete for construction generally involves the process of mixing together various ingredients to produce concrete and then letting the concrete cure, or harden, to produce the finished product. The ingredients generally include cement, water, aggregate, such as sand, gravel, or stone, and various admixture chemicals, depending on the particular application. Commercial concrete production typically occurs in a concrete plant, which is typically a large industrial facility. Commercial concrete plants are often referred to as batch plants because the concrete produced in such facilities is produced in large batches. Concrete plants may be dry mix concrete plants or wet mix concrete plants, depending on whether water is added to the concrete mix on-site at the plant. In either case, the resulting concrete mix is typically loaded onto trucks for transport of the concrete mix to a construction site for final placement.

Concrete plants generally include numerous pieces of large equipment required for the production of concrete. For instance, concrete plants have large storage hoppers to store various ingredients, such as the aggregate and cement, a large mixer for mixing all of the ingredients, cement batchers, aggregate batchers, and conveyors. Large concrete plants are generally capable of efficiently producing large quantities of high-quality concrete. However, there are drawbacks to large, stationary concrete plants. For instance, batches of concrete must be transported from the plant to off-site locations, which may be far from the plant. In some cases, mobile concrete plants have been utilized at remote construction sites to produce concrete on-site to overcome some of the disadvantages of large, stationary plants. However, the process of moving such a mobile plant from one construction site to another and then setting up the mobile plant at the new site may be expensive and time-consuming, which may increase the cost of the concrete produced by a mobile plant.

SUMMARY

A modular concrete production system and a method of using the system to produce concrete are provided. The system comprises a concrete mixing unit, a power supply unit, and a water supply unit. Each unit is portable and may be individually transported to a construction site for on-site concrete production. Once placed on-site, the individual units may be operatively connected to each other to produce concrete at the construction site. The concrete mixing unit includes a cement hopper and one or more aggregate hoppers. The system further comprises a plurality of modular cement bins and aggregate bins. The cement bins are each designed to be stacked on a top side of the cement hopper, and the aggregate bins are each designed to be stacked on a top side of one or more of the aggregate hoppers. The bins may be pre-loaded with cement or an appropriate type of aggregate, such as sand or crushed stone, at a centralized or off-site facility and then transported individually to a specific concrete production site to be stored and used on-site as needed. Each bin has a closable gate on a bottom side of the bin. Each bin may be stacked onto the top of the appropriate hopper (cement or aggregate), and the gate on the bottom of the bin may then be opened to allow the contents of the bin to be gravity fed into the hopper below. When the contents of a bin are depleted, the empty bin may be removed and a new bin may be installed by stacking the bin onto the top of the appropriate hopper. The gate on the bottom of the new bin may then be opened to feed the contents into the hopper below, which allows the system to maintain a continuous supply of cement and aggregate to the mixer so that the system may be operated continuously. The modular bins reduce material handling at the concrete production site and thus may reduce dust emissions from cement and aggregate handling.

The concrete mixing unit comprises a concrete mixer having inputs for water from a water tank on the water supply unit, for cement from the cement hopper, and for aggregate from one or more aggregate hoppers. The concrete mixer may further comprise a mixing auger that mixes the ingredients to form wet concrete slurry and conveys the wet concrete slurry from the mixer to a discharge point. The power supply unit comprises a generator for supplying power to the concrete mixing unit. The generator and other components of the power supply unit, which preferably includes a control room that allows centralized control of the concrete production process, are preferably contained within an enclosed structure that is mounted on a portable skid. The water supply unit comprises a water tank, which is preferably also mounted on a portable skid. The system may also include one or more admixture storage tanks and a pump for supplying admixture chemicals to the concrete mixer.

Once the individual units of the system have been transported to a work site, the units may be operatively connected to each other to collectively operate as a concrete production system. First, the power supply unit is operatively connected to the concrete mixing unit such that the generator supplies power to the concrete mixing unit. Electrical power cords may be utilized to connect the generator of the power supply unit to the concrete mixing unit. The power supply unit may supply power to the concrete mixing unit to power a motor that powers the concrete mixer, one or more conveyor belts for conveying aggregate into the mixer, and a dry cement auger for metering cement into the mixer. Additionally, the power supply unit may supply power to a water pump for supplying water to the concrete mixer and to an admixture pump for supplying admixture chemicals into the concrete mixer. The water and admixture pumps are preferably installed on the water supply unit. The generator may also supply power to control systems for controlling operation of the concrete production system, lighting on all of the units, and any other auxiliary systems requiring electrical power. Next, a water supply line is connected to the water tank of the water supply unit and to the concrete mixer of the concrete mixing unit for supplying water to the concrete mixer from the water tank.

Once the units are set in place and operatively connected to each other, the water, cement, and aggregate may be continuously and homogenously mixed in the concrete mixer to form the wet concrete slurry. The wet concrete slurry may then be continuously discharged by the mixing auger to a discharge point. The concrete slurry may be discharged to a concrete boom pump or other suitable conveyance device for pouring the concrete. Thus, the present system may be operated as a continuous on-site concrete production system. Once set up, the system may preferably produce up to 80 cubic yards of high-quality concrete per hour. The system does not require settling ponds and generally also does not require height permits because the individual units are constructed within legal height limits, as well as within load limits for road transport.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

The present disclosure provides a modular concrete production system and a method of using the system to produce concrete in accordance with the independent claims. Preferred embodiments of the invention are reflected in the dependent claims. The claimed invention can be better understood in view of the embodiments described and illustrated in the present disclosure. In general, the present disclosure reflects preferred embodiments of the invention. However, some aspects of the disclosed embodiments may extend beyond the scope of the claims. To the respect that the disclosed embodiments indeed extend beyond the scope of the claims, the disclosed embodiments are to be considered supplementary background information and do not constitute definitions of the invention per se.

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 5:
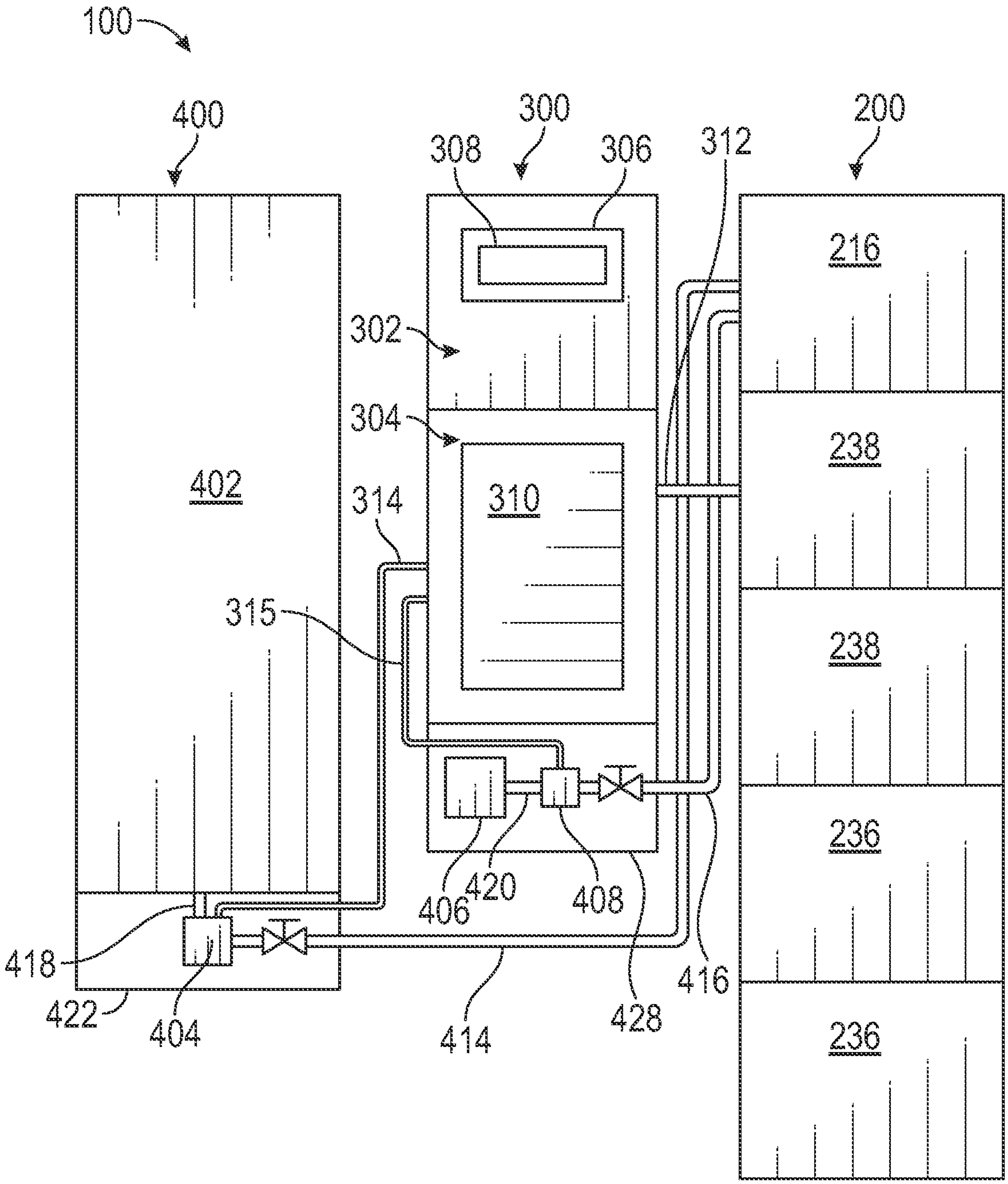
FIG. 5 shows a schematic view of a modular concrete production system in accordance with the present disclosure.
Figure 6:
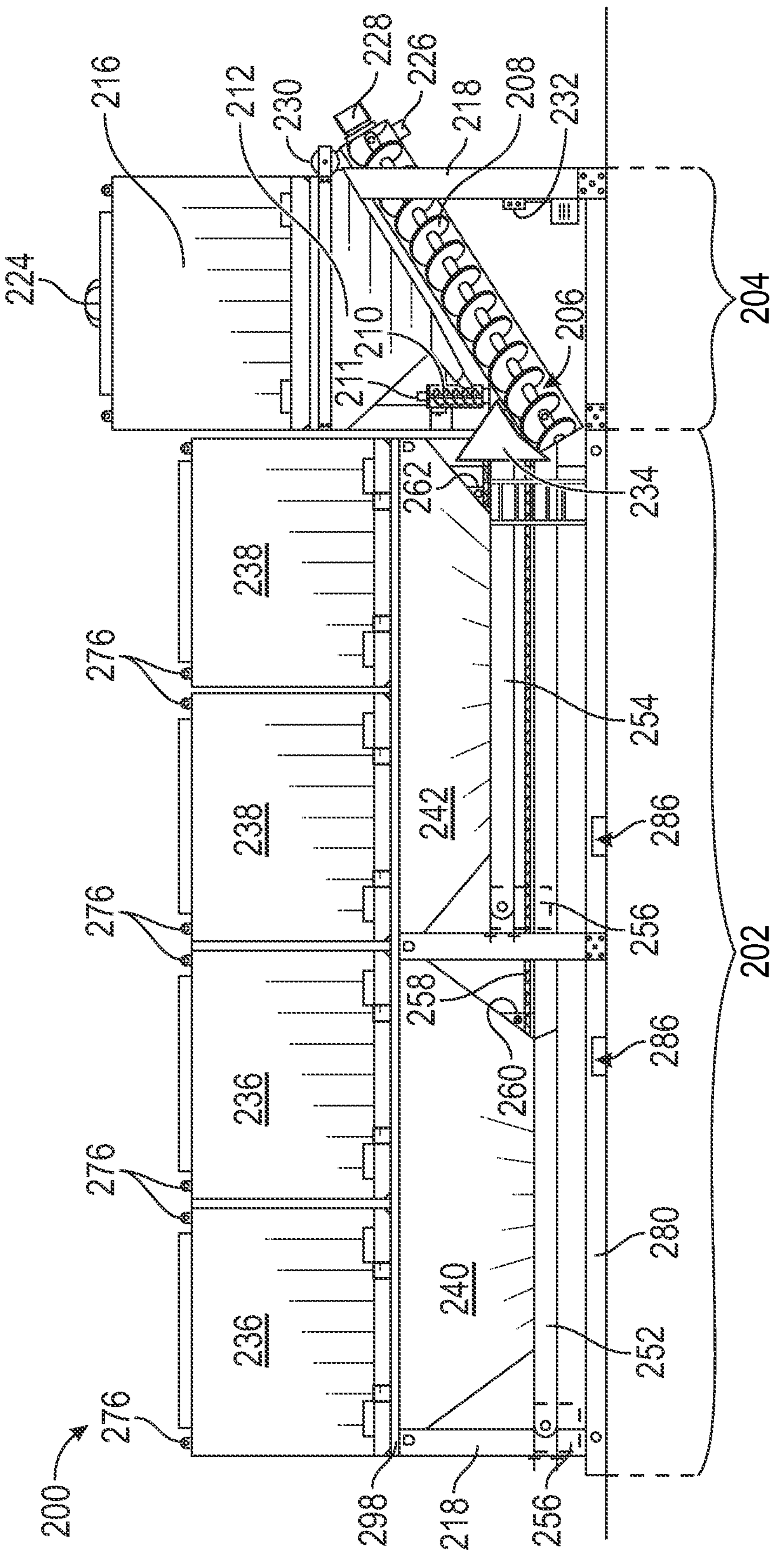
FIG. 6 shows a side view of a concrete mixing unit of a modular concrete production system in accordance with the present disclosure.

A modular concrete production system 100 and a method of using the system to produce concrete are provided. FIGS. 1-14 illustrate preferred embodiments of the present system 100. As shown in FIGS. 1-5, the system 100 comprises a concrete mixing unit 200, a power supply unit 300, and a water supply unit 400. Each unit is portable so that the units may be individually transported to any construction site and then operatively connected to each other to produce concrete on-site. The concrete mixing unit 200 includes a cement hopper 212 and one or more aggregate hoppers 240, 242. The system 100 further comprises a plurality of modular cement bins 216 and aggregate bins 236, 238, which may include bins loaded with different types of aggregate, including but not limited to sand, crushed stone, or gravel. As best seen in FIGS. 3 and 6, the system 100 may preferably include bins 236 for stone and bins 238 for sand. The system 100 preferably includes more than one aggregate hopper so that at least two different types of aggregate may be utilized at the same time, though it should be understood that a system utilizing a single aggregate hopper would still fall within the scope of the present disclosure. In a preferred embodiment, the concrete mixing unit 200 comprises two aggregate hoppers 240, 242 for two types of aggregate to be used in a concrete mix.

The cement bins 216 are each designed to be stacked on a top side 244 of the cement hopper 212, and the aggregate bins 236, 238 are each designed to be stacked on a top side 246, 248 of one or more aggregate hoppers 240, 242. The bins 216, 236, 238 may be pre-loaded with cement or an appropriate type of aggregate 258, such as sand or gravel, at an off-site location and then transported individually to a specific concrete production site to be stored and used on-site as needed. Cement bins 216 and different types of aggregate bins 236, 238 may be filled at the same or at different off-site locations before transporting the bins 216, 236, 238 to the on-site location for use. Each bin 216, 236, 238 has a closable gate 268 on a bottom side 220 of the bin 216, 236, 238. Each bin 216, 236, 238 may be stacked onto the top of the appropriate hopper 212, 240, or 242, and the gate 268 on the bottom 220 of the bin may then be opened to allow the contents of the bin 216, 236, 238 to be gravity fed into the hopper 212, 240, or 242 below. When the contents of a bin are depleted, the empty bin may be removed and a new bin may be installed by stacking the new bin onto the top of the appropriate hopper. The gate on the bottom of the new bin may then be opened to feed the contents into the hopper below, which allows the system to maintain a continuous supply of cement and aggregate to the mixer so that the system may be operated continuously. The modular bins 216, 236, 238 reduce material handling at the concrete production site and thus may reduce dust emissions from cement and aggregate handling. A bin may include any type of stackable container suitable for filling with cement or aggregate and having a closable gate on the bottom of the container.

Figure 1:
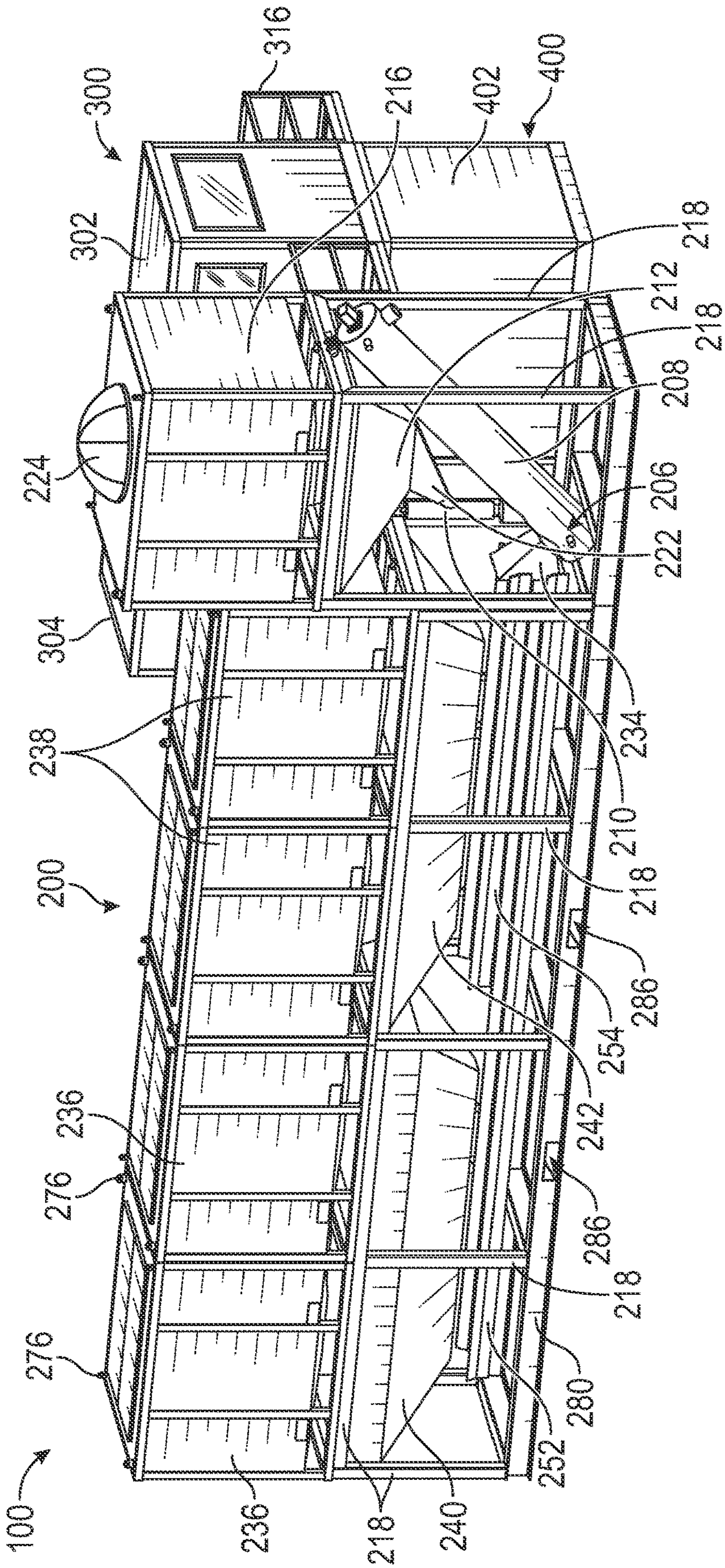
FIG. 1 shows a perspective view of a modular concrete production system in accordance with the present disclosure.
Figure 2:
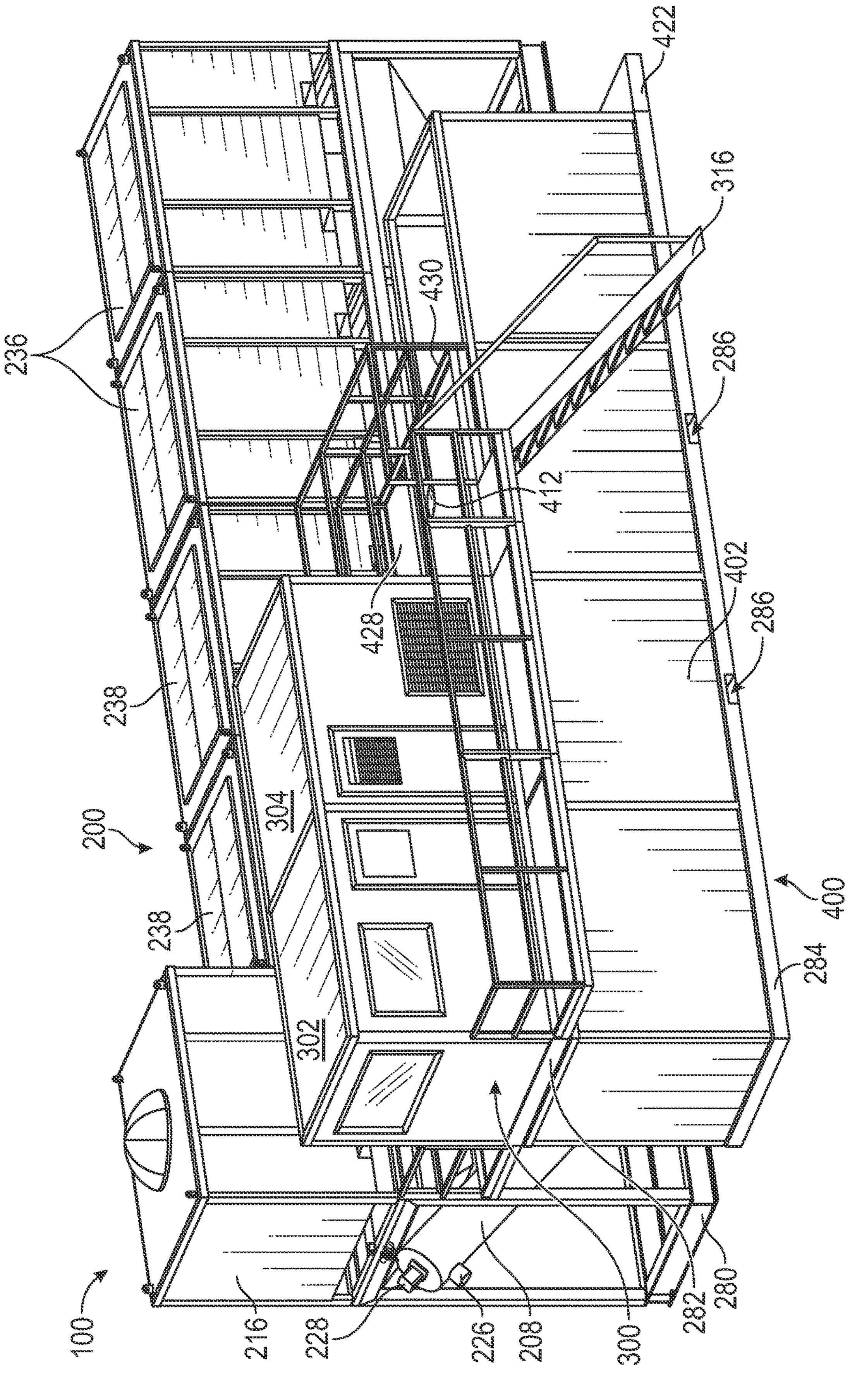
FIG. 2 shows a perspective view of a modular concrete production system in accordance with the present disclosure.
Figure 3:
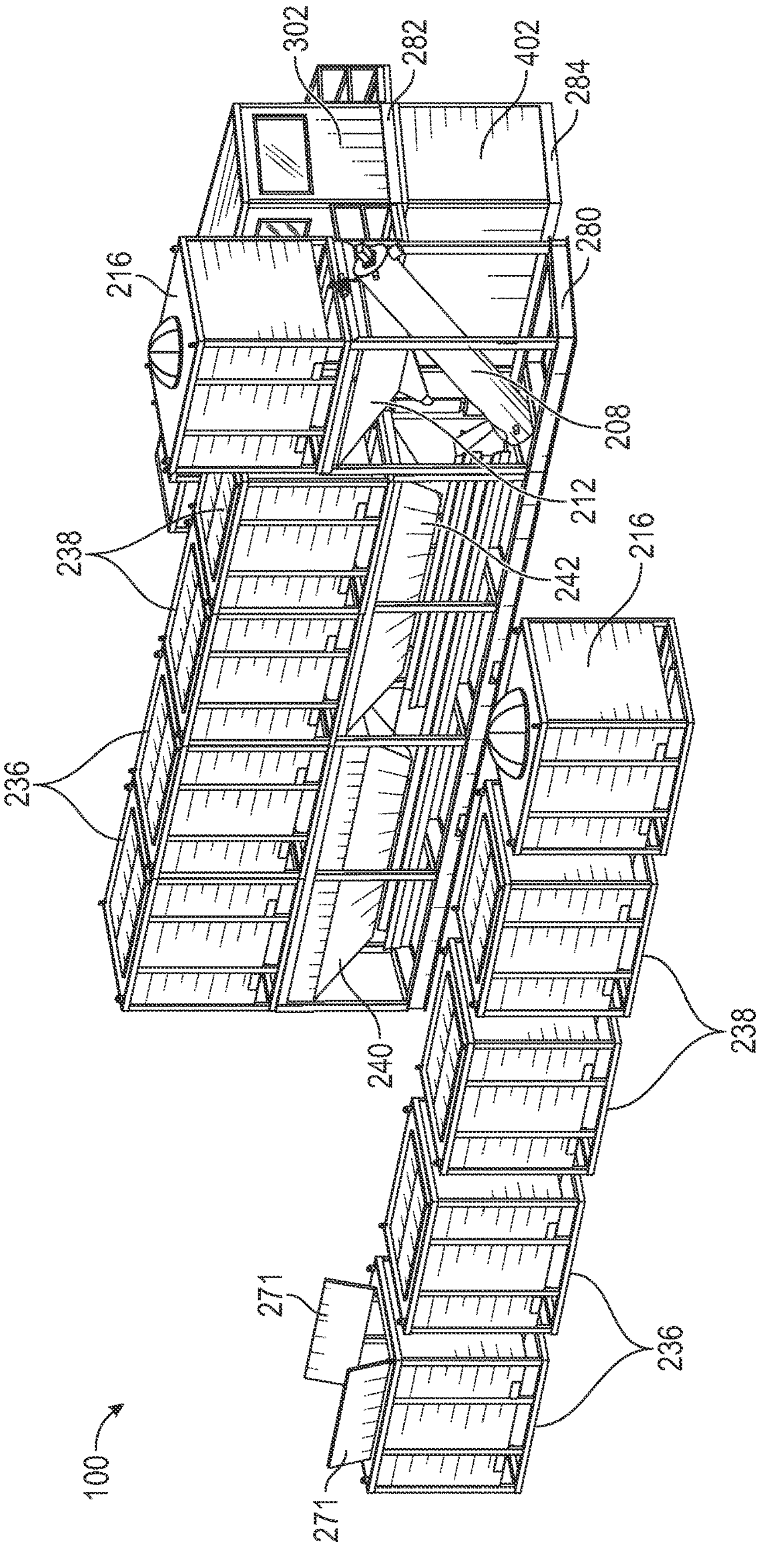
FIG. 3 shows a perspective view of a modular concrete production system in accordance with the present disclosure.
Figure 4:
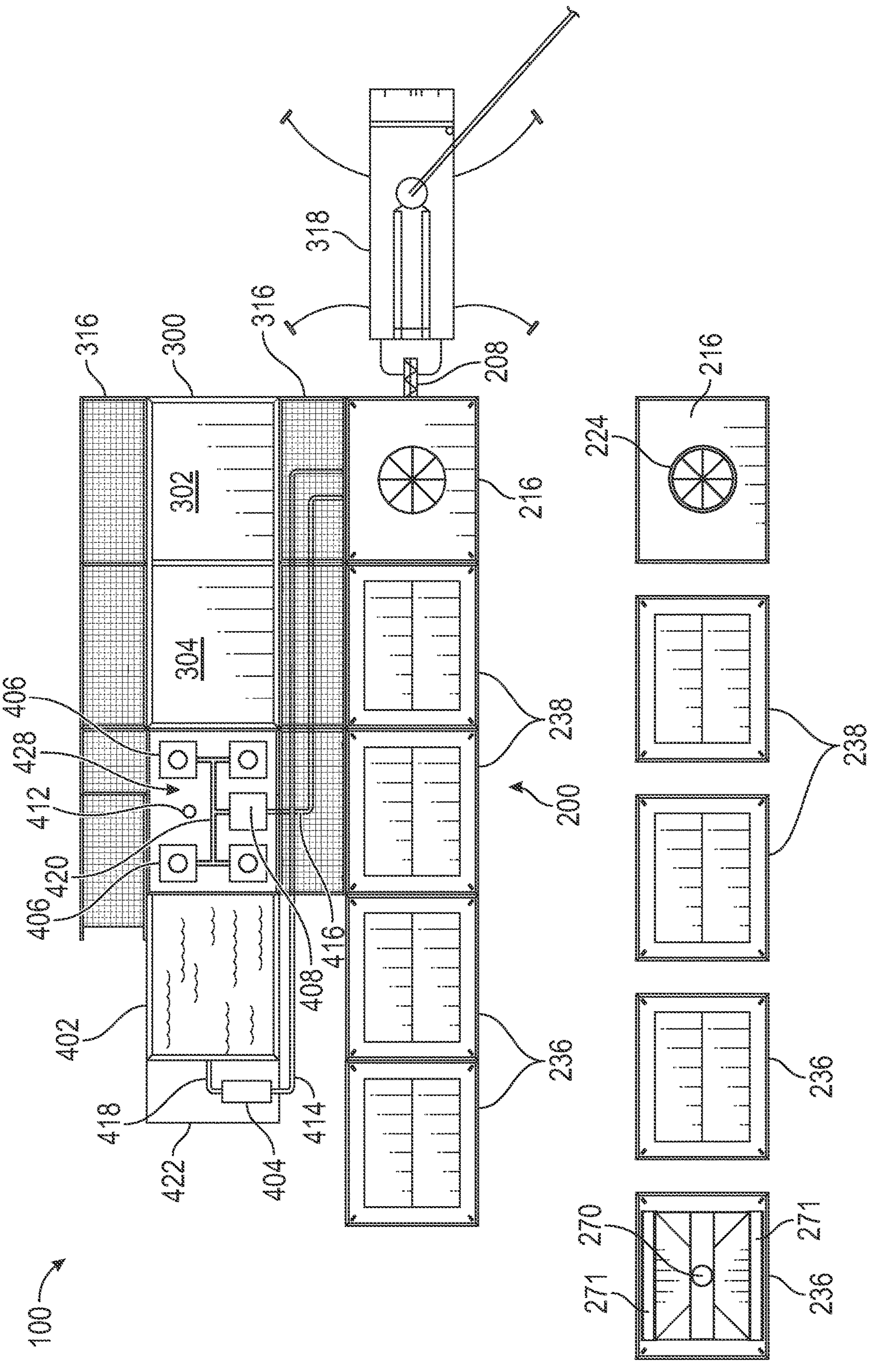
FIG. 4 shows a top plan view of a modular concrete production system, including a concrete boom pump, in accordance with the present disclosure.
Figure 7:
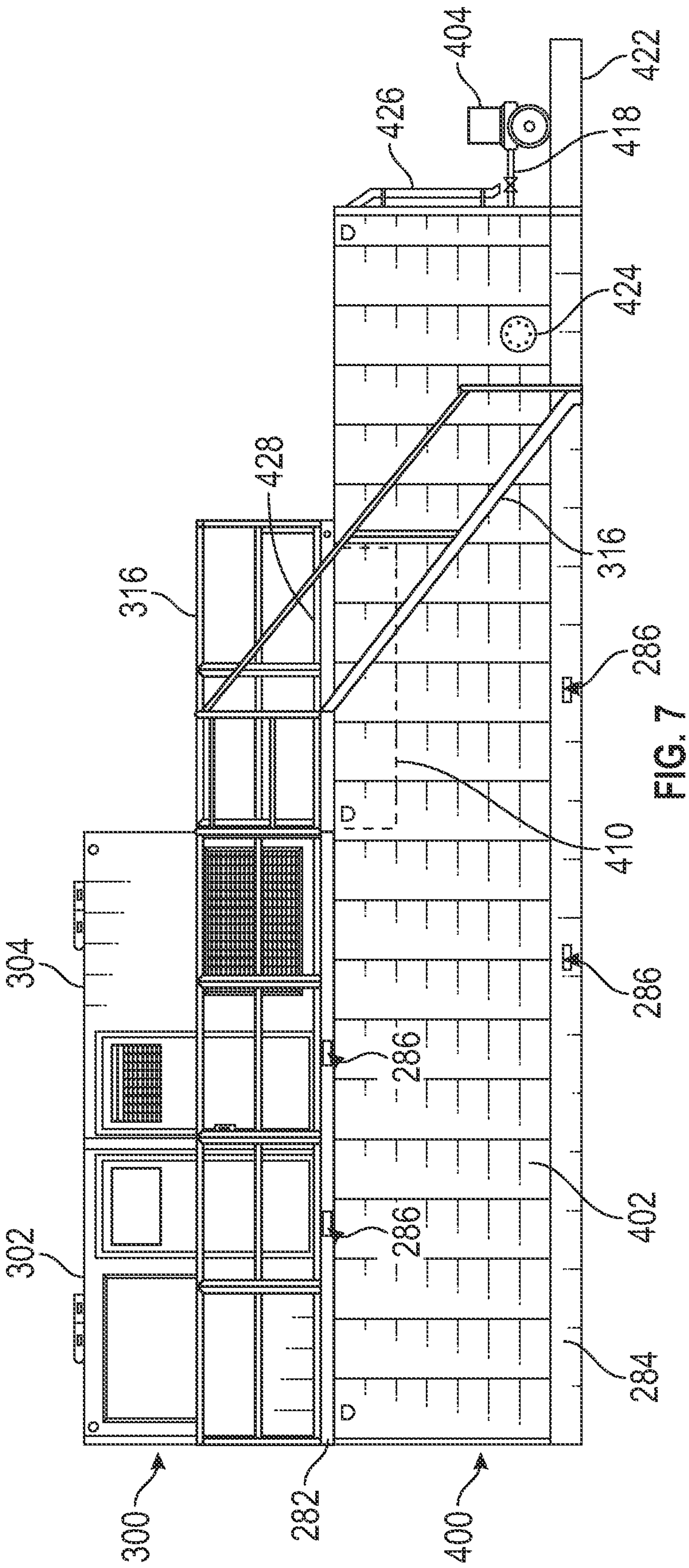
FIG. 7 shows a side view of a power supply unit of a modular concrete production system stacked onto the top of a water supply unit in accordance with the present disclosure.
Figure 11:
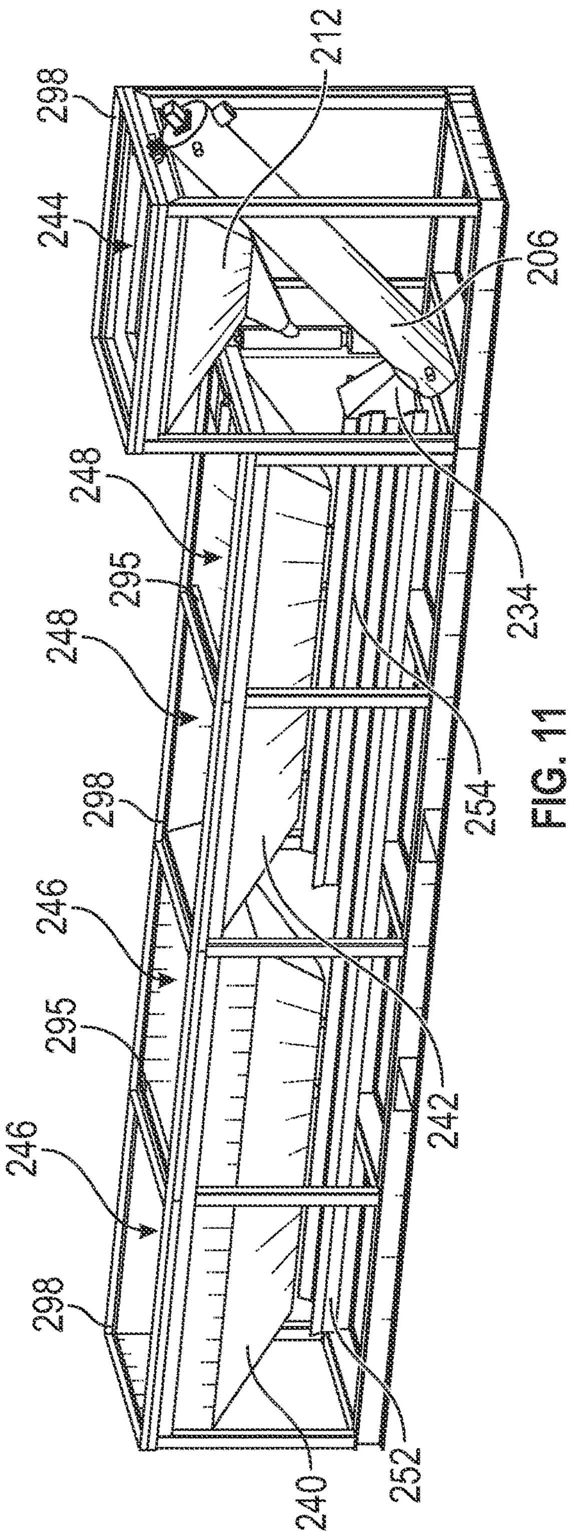
FIG. 11 shows a perspective view of a concrete mixing unit of a modular concrete production system in accordance with the present disclosure.

FIGS. 1-4 illustrate the individual units of the system 100, which include the concrete mixing unit 200, the power supply unit 300, and the water supply unit 400, in a preferred physical configuration relative to the other units. FIGS. 3 and 4 illustrate the system 100 with cement 216 and aggregate bins 236, 238 stacked on top of the appropriate hoppers as well as additional cement 216 and aggregate bins 236, 238 stored on-site with the units 200, 300, 400 of the system. These additional bins may be utilized to replace bins being used when those bins are depleted of their contents. FIG. 11 shows the concrete mixing unit 200 with the cement 216 and aggregate bins 236, 238 removed from the hoppers 212, 240, 242. As best seen in FIGS. 2 and 7, the power supply unit 300 is preferably stacked on top of the water supply unit 400 to conserve space at the concrete production site. FIG. 5 shows a schematic view of the units with the power supply unit 300 and water supply unit 400 in an optional side-by-side configuration to better illustrate connections between the units, which include a water supply line 414, an admixture supply line 416, and electrical connections 312 and 314 that supply power from a generator 310 of the power supply unit 300 to other components of the system 100.

In a preferred embodiment, as best seen in FIGS. 1-3 and 6-7, components of each of the concrete mixing unit 200, the power supply unit 300, and the water supply unit 400 may be mounted onto a first portable skid 280, a second portable skid 282, and a third portable skid 284, respectively. As used herein, the term "skid" or grammatical equivalents thereof may refer to any type of generally planar structure configured for mounting components of a portable concrete production system on the structure for transport of the skid with components mounted thereon and for use of the skid with mounted components thereon in a process for producing concrete. The components may preferably be permanently mounted on each skid. The units 200, 300, 400 may be loaded onto or off of a transportation vehicle by a forklift. Each skid 280, 282, 284 may include lift points 286 that are defined by openings spaced apart from each other so that a forklift may be used to lift the skid. Alternatively, the skids may be loaded for transportation using a winch or a crane. In this case, each skid may have attachment points to which cables may be secured. The skids may be sized to so that each skid may be transported by rail or on a standard cargo truck. In a preferred embodiment, each skid may be constructed using treated metal beams that are attached to each other to form a generally rectangular structure having cross beams for structural support of the components mounted thereon. One or more of the skids may optionally be mounted on a trailer having wheels for road transportation by truck.

Figure 9:
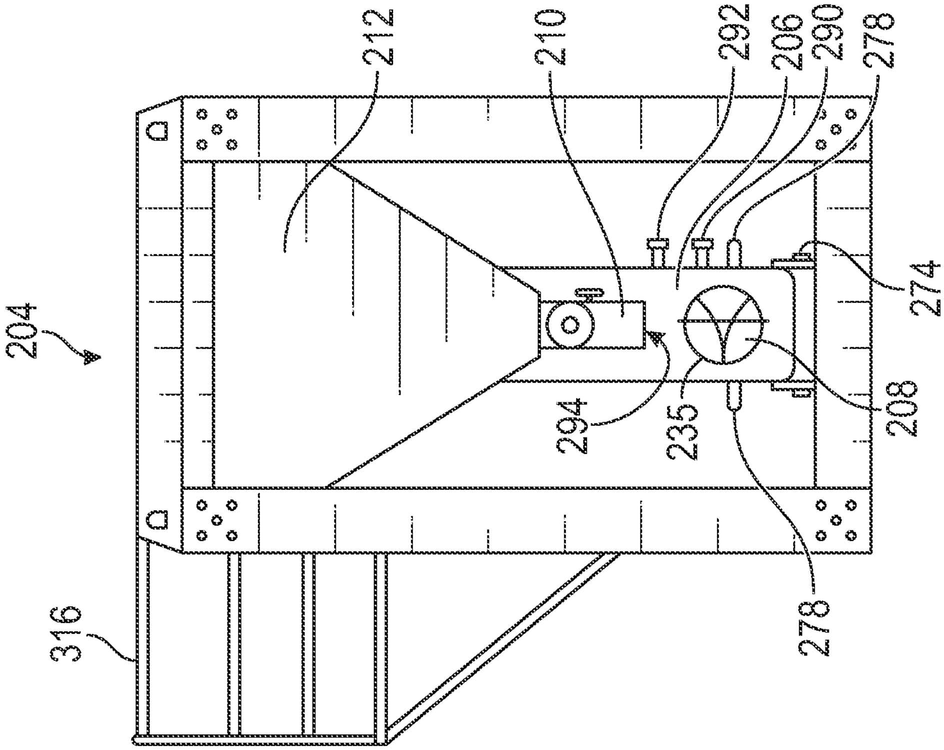
FIG. 9 shows a rear view of a concrete mixer of a modular concrete production system in accordance with the present disclosure.
Figure 8:
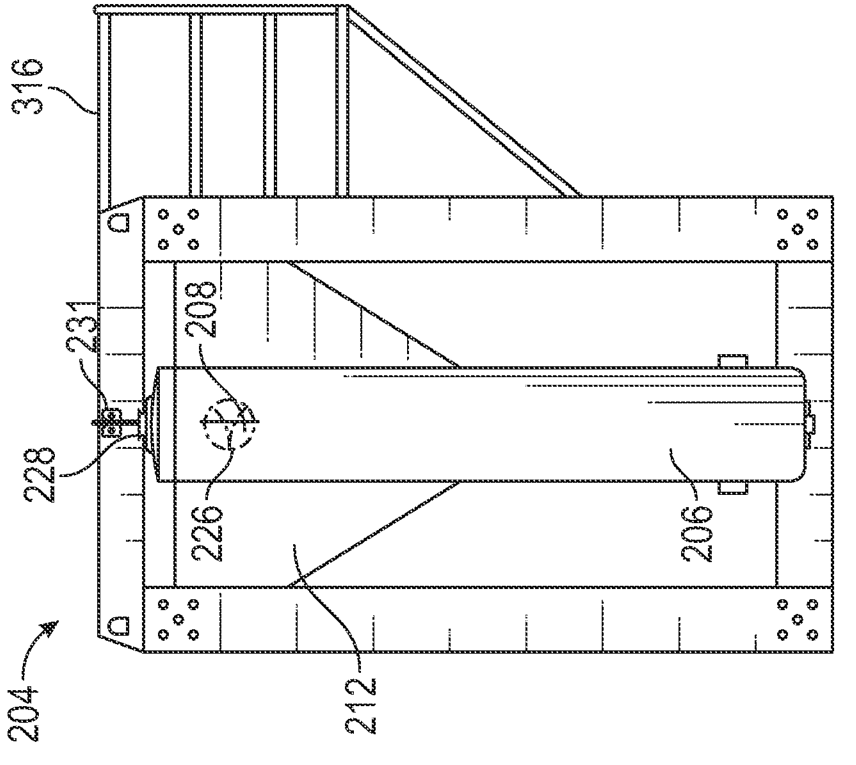
FIG. 8 shows a front view of a concrete mixer of a modular concrete production system in accordance with the present disclosure.
Figure 10:
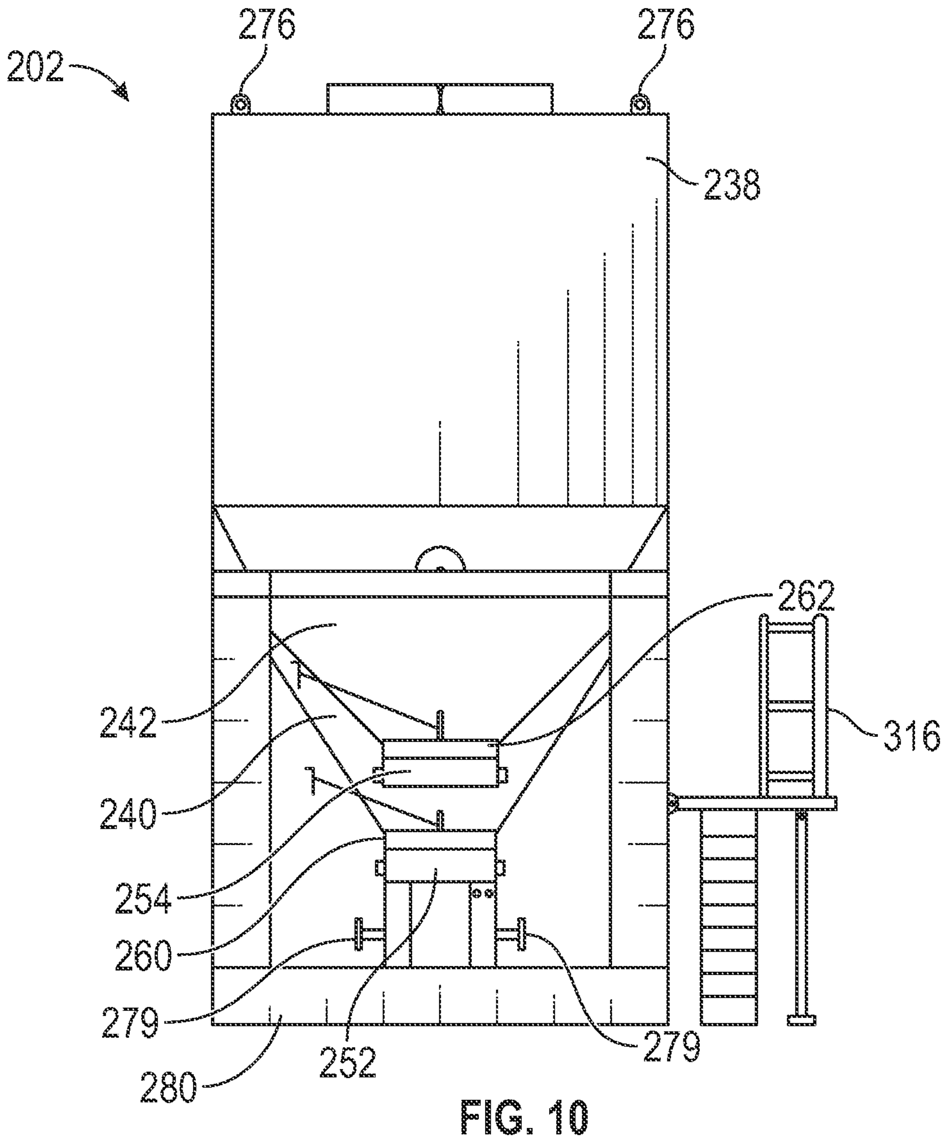
FIG. 10 shows a front view of an aggregate feed unit of a modular concrete production system in accordance with the present disclosure.

As best seen in FIGS. 1, 6, and 11, the concrete mixing unit 200 comprises a concrete mixer 206 having an input 294 for cement from the cement hopper 212, an input 235 for aggregate 258 from one or more aggregate hoppers 240, 242, and an input 290 for water, which may have a water supply line 414 connected thereto to supply water from a water tank 402 on the water supply unit 400. The concrete mixing unit 200 preferably also includes an input 292 for admixture chemicals from one or more admixture tanks 406 via an admixture supply line 416. FIG. 9 shows the location of each of the inputs into the concrete mixer 206. As illustrated in FIG. 6, the concrete mixing unit 200 may comprise an aggregate feeder unit 202 that feeds aggregate 258 into the concrete mixer 206 and a mixer unit 204 that mixes the components into a wet concrete slurry. The aggregate feeder unit 202 and the mixer unit 204 may be installed onto a single skid 280, or may optionally be installed onto two separate skids for ease of transport and then connected to each other on-site, as shown in FIG. 6. FIGS. 8 and 9 show front and rear views, respectively, of the mixer unit 204 disconnected from the aggregate feeder unit 202, and FIG. 10 shows a front view of the aggregate feeder unit 202. The aggregate feeder unit 202 and the mixer unit 204 may be bolted or otherwise fastened to each other to connect the units. In one embodiment, as shown in FIGS. 9 and 10, the mixer unit 204 may comprise two stabilization bars 278, which may be attached to opposite sides of the concrete mixer 206, and the aggregate feeder unit 202 may also comprise two stabilization bars 279. Units 202 and 204 may be placed directly adjacent to each other, as shown in FIG. 6, and stabilization bars 278 and 279 may be rigidly linked together to secure the two units 202, 204 to each other.

The concrete mixer 206 may further comprise a mixing auger 208 that mixes the ingredients input into the mixer 206 and conveys wet concrete slurry from the concrete mixer 206 to a discharge point 226. The concrete mixer 206 may further comprise a cement auger 210 that is configured to convey cement from the cement hopper 212 into the concrete mixer 206. As best seen in FIG. 1, the mixing auger 208 may be disposed within a cylindrical housing, which is preferably disposed at an angle to the skid 280 on which the mixer unit 204 is mounted. The cement auger 210 is preferably disposed in a generally vertical position. FIG. 6 shows both augers 208, 210 with a portion of each of the housings removed so that the augers are visible. The mixing auger 208 may be operated by electrical motor 228 mounted at an end of the housing in which the mixing auger 208 is disposed, and the cement auger 210 may be operated by electrical motor 211 mounted at an end of the housing in which the cement auger 210 is disposed. Motors 228 and 211 may be operated using controls 232 on the concrete mixing unit 200. As best seen in FIG. 9, the concrete mixer 206 may be pivotally mounted on the skid 280 by hinges 274. As best seen in FIG. 6, the mixing unit 204 preferably includes a winch 230 having a cable that is connected to the concrete mixer 206 housing so that the discharge point 226 may be adjusted by lowering or raising the end of the concrete mixer 206 at which the discharge point 226 is disposed. The winch 230 cable may be connected to an attachment point 231 on the concrete mixer 206 housing, as shown in FIG. 8. As shown in FIG. 4, the mixing auger 208 may discharge the wet concrete slurry to a concrete boom pump 318 for conveying the slurry to an on-site location for final placement. Alternatively, the slurry may be discharged to a concrete truck or any other suitable type of conveyor configured to convey the slurry to a desired location for final placement.

As best seen in FIGS. 1 and 6, the concrete mixing unit 200 further comprises a conveyor, which is preferably a conveyor belt, configured to transfer aggregate 258 from the one or more aggregate hoppers 240, 242 into the concrete mixer 206. In a preferred embodiment, the system comprises a stone hopper 240 and a sand hopper 242 so that two different types of aggregate may be utilized in a concrete mix. Each aggregate hopper 240, 242 has an upper aggregate hopper opening. Thus, as illustrated in FIG. 11, the stone hopper 240 has an upper opening 246, and the sand hopper 242 also has an upper opening 248. Similarly, the cement hopper 212 also has an upper cement hopper opening 244. In a preferred embodiment, the upper end of each hopper 212, 240, 242 has a rectangular shape and is generally open. The aggregate hoppers 240, 242 are preferably designed to each accommodate two stacked aggregate bins 236, 238, as shown in FIG. 6, and may thus be longer than the cement hopper 212 to accommodate two bins stacked side by side. The cement hopper 212 is preferably designed to accommodate a single cement bin 216. Each of the aggregate hoppers 240, 242 may have a cross support structure 295 at a midpoint of the hopper for added structural support in supporting multiple aggregate bins 236, 238. As best seen in FIGS. 1 and 11, the cement hopper 212 and aggregate hoppers 240, 242 may be mounted on structural frame members 218 that are attached to the portable skid 280. Some of the frame members 218 are attached directly to the skid 280 and extend upwardly from the skid 280. These frame members 218 may be interconnected by both latitudinal and longitudinal frame members 218 to provide a structural frame support 218 for the hoppers 212, 240, 242 and other components of the concrete mixing unit 200. For instance, winch 230 may be mounted on one of the frame members 218.

Figure 12:
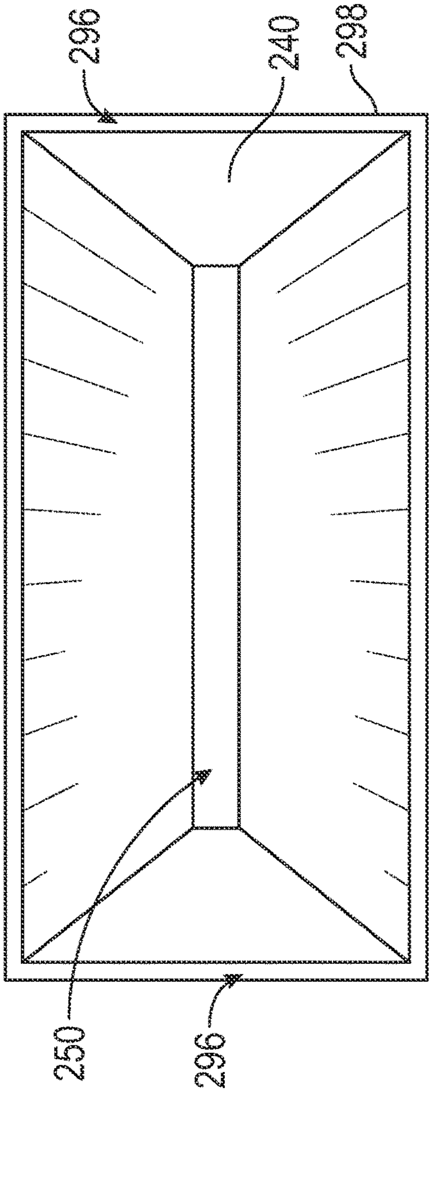
FIG. 12 shows a top plan view of a hopper of a concrete mixing unit of a modular concrete production system in accordance with the present disclosure.

FIG. 12 shows a top view of the stone hopper 240, which has features that are also generally representative of the sand hopper 242 and the cement hopper 212. Each hopper 212, 240, 242 preferably has sloped side walls and has a lower opening 250, which is preferably an elongated opening, as best seen in FIG. 12, at a bottom end of the hopper to allow the contents of bins 216, 236, and 238 to feed into the top of the appropriate hopper and then drop down through the bottom opening 250 of the hopper. As shown in FIG. 1, the cement hopper 212 may have a funnel section 222 attached to the bottom of the hopper 212 to connect the bottom opening 250 of the cement hopper 212 to the cement auger 210 so that the cement auger 210 may convey cement from the hopper 212 into the concrete mixer 206 at input 294, which is preferably near a low point of the concrete mixer 206.

In a preferred embodiment, each hopper 212, 240, 242 comprises a bin support structure 296 upon which each bin 216, 236, 238 rests when the bin is stacked on the top side of the hopper. As shown in FIG. 12, the support structure is preferably a generally flat upwardly facing surface 296 around a perimeter of the upper opening 244, 246, 248 of the hopper that supports a bin 216, 236, or 238 that is stacked on the hopper. Alternatively, the support structure 296 may take other forms suitable for supporting a bin stacked onto the hopper. In a preferred embodiment, each hopper 212, 240, 242 further comprises a rim 298 that extends upwardly from support surface 296, as illustrated in FIGS. 6 and 11. The rim 298 is preferably disposed around an outer perimeter of the hopper 212, 240, 242. The rim 298 may be attached directly to the hopper itself or alternatively to a separate support structure, such as a frame member 218 attached to skid 280. Each bin 216, 236, 238 may then sized to fit within a boundary defined by the rim 298 when the bin is stacked on the top side of the hopper. Thus, when one of the bins 216, 236, 238 is stacked on the support structure 296 of the hopper 212, 240, 242, the rim 298 may prevent any unwanted movement of the bin, such as movement due to vibration when operating the unit 200, so that each bin remains in place during operation. In a preferred embodiment, each bin 216, 236, 238 may have a lower frame structure 214 on a bottom side 220 of the bin that fits within the rim 298 to prevent movement of the bin. Although the rim 298 is shown as a continuous structure around the perimeter of each hopper, the rim 298 may optionally be segmented or non-continuous. Alternatively, other structures suitable to keep the stacked bins in place and prevent movement of the bins may be utilized. For instance, a spring-loaded pin or other suitable type of fastener may be utilized to removably secure a bin in place when the bin is stacked on a hopper. Thus, when one of the bins 216, 236, 238 is "stacked" on one of the hoppers 212, 240, 242, the stacked bin is removably supported in place in a position above the hopper. The stacked bin may rest directly on the hopper or on another structure that allows the bin to be removably supported in a position above the hopper, such as a separate frame member 218 to which the hopper may be mounted. An optional fastener may be utilized in addition to a structural support to removably lock the bin in place during normal operation of the system. This allows replacement of bins by removing one bin and re-stacking a new bin in its place.

In a preferred embodiment, as best seen in FIGS. 1, 6, and 10, the opening 250 at the bottom of the stone hopper 240 is lower than the opening 250 at the bottom end of the sand hopper 242, and the unit 200 comprises a stone conveyor 252 to transfer stone 258 into the concrete mixer 206 and a sand conveyor 254 to convey sand into the mixer 206. The stone conveyor 252 is preferably positioned below the sand conveyor 254. The stone conveyor 252 and sand conveyor 254 are preferably both conveyor belts each driven by an electric motor 256, as shown in FIG. 6. FIG. 1 shows the conveyors 252 and 254 each having a guard longitudinally disposed along the edges of the conveyor belts to prevent loose aggregate 258 from falling off the edge of the belt during operation of the unit 200. As best seen in FIGS. 6 and 10, each conveyor 252 and 254 preferably has a gate 260 and 262, respectively, positioned downstream of hoppers 240 and 242, respectively, to control the flow of loose aggregate 258 into the concrete mixer 206. Each gate 260, 262 may be raised or lowered to vary the size of an opening between the bottom of each gate 260, 262 and its respective conveyor belt 252 and 254 on which the aggregate 258 is conveyed. As best seen in FIG. 10, each gate 260, 262 may be operated manually by a handle to control the flow of aggregate 258. FIG. 10 shows the gates in a closed position from which the gates 260, 262 may be raised to allow aggregate 258 to pass under each gate. Alternatively, the gates may be automated.

As best seen in FIG. 9, the aggregate input 235 preferably comprises an opening in the housing in which the mixing auger 208 is disposed. Conveyor belts 252 and 254 may convey aggregate 258 into opening 235 to input aggregate 258 into the concrete mixer 206. As best seen in FIGS. 1 and 6, the concrete mixing unit 200 may comprise a funneling structure 234 into which the aggregate 258 flows off the end of conveyor belts 252 and 254. The funneling structure 234 directs the aggregate 258 into the concrete mixer 206. The cement auger 210 preferably conveys cement into the concrete mixer 206 at a cement input 294 location just above the aggregate input 235. A water input connection 290 and an admixture input connection 292 are preferably located on a side of the concrete mixer 206 in close proximity to the aggregate input 235 and cement input 294. As best seen in FIG. 9, inputs 235, 290, 292, and 294 are preferably disposed at a position generally near the bottom of the housing of the concrete mixer 206. The mixing auger 208 mixes all of the ingredients generally around a low point within the concrete mixer 206 and continues to mix the ingredients into a wet concrete slurry as the auger 208 conveys the mixture upward toward the discharge point 226.

The power supply unit 300 comprises an electric generator 310 that may be used to provide electrical power to all electrical components of the system 100. In a preferred embodiment, the second portable skid 282 on which components of the power supply unit 300 are mounted is designed to be stacked on a top side of the water tank 402 of the water supply unit 400. Thus, the power supply unit 300 may be stacked on top of the water supply unit 400, as best seen in FIG. 7, which limits the size of the overall footprint of the system 100 when installed on-site. The generator 310 and other components of the power supply unit 300 are preferably contained within an enclosed structure that is mounted on portable skid 282. As best seen in FIGS. 4 and 5, the enclosed structure is preferably divided into two separate rooms, which include a motor room 304 that houses the generator 310 and a control room 302 that houses a control system 306 configured to control various aspects of the concrete production system 100. The generator 310 is preferably a unit including a 200 kW generator driven by a 60-horsepower three-phase diesel motor housed in the motor room 304, as shown in FIG. 5. The generator 310 may be used as a power source to provide electrical power to various components of the system 100, including the mixing auger 206, the cement auger 210, the stone conveyor belt 252 and sand conveyor belt 254, the control system 306, a water pump 404, an admixture pump 408, as well as any other auxiliary systems or equipment requiring electrical power, such as lights for nighttime operations. Alternatively, some components, such as augers 208 and 210, may be powered by hydraulic motors.

In a preferred embodiment, the enclosed structure of the power supply unit 300 is constructed from a recycled shipping container mounted on a skid 282 and modified to divide the container into two separate rooms, which are the control room 302 and the motor room 304. As shown in FIGS. 2 and 7, each room 302 and 304 preferably has its own access door. The motor room 304 preferably has vents built into the walls and door to provide ventilation for the motor room 304 and air cooling for the generator 310. The motor room 304 may also have an exhaust installed on the roof of the container for the generator motor. The control room 302 preferably has windows built into the walls and door to provide visibility of the system 100 for an operator inside the control room 302. The control room 302 provides a centralized location for an operator of the system 100 to control operation of various pieces of equipment within the system 100. The control room 302 preferably has insulated walls to minimize noise and to moderate the temperature of the room. The control room 302 optionally has a heating and cooling unit for temperature control, which may be powered by the generator 310 and may be installed on the roof of the shipping container.

The system 100 preferably includes a control system 306 configured to control various aspects of concrete production. The control system 306 includes a control panel 308, which is preferably housed within the control room 302 of the power supply unit 300. The control panel 308 is configured to allow an operator to control electrical power from the generator 310 to all components of the system 100 that are electrically powered by the generator 310, such as the augers 210 and 212, conveyors 252 and 254, and pumps 404 and 408. As shown in FIG. 6, the control system 306 may optionally include some remotely located controls 232 installed on the concrete mixing unit 200 and configured for controlling certain operations of the concrete mixer 206. The control system 306 allows an operator of the system 100 to utilize the control panel 308 to control the rate of input of water, cement, aggregate, and admixture chemicals into the concrete mixer 206 by controlling the speed of the water pump 404, the cement auger 210, the aggregate conveyor belts 252 and 254, and the admixture pump 406. The control system 306 may also be used to control the output of concrete slurry by controlling the speed of the mixing auger 208.

Any control system suitable for controlling concrete mixing operations may be adapted for use with the present concrete production system 100. The control system 306 may optionally include a wireless remote that allows control of certain system functions remotely by an operator who is not present at the control panel 308 in the control room 302. For instance, an operator outside the control room 302 may use the wireless remote for emergency shutdown functions should the operator observe any operational problems requiring immediate shutdown of the system 100. The control system 306 may also optionally include surveillance monitors located at the input points of the cement, water, aggregate, and admixture chemicals on the concrete mixing unit 200 for blowout detection for the operator in the control room 302.

As best seen in FIGS. 2, 4, 5, and 7, the water supply unit 400 comprises a water tank 402, which may be mounted on a portable skid 284. The water tank 402 preferably has a capacity of at least 7,000 gallons and is preferably constructed from a recycled shipping container tank that is modified for use with the present system 100. As best seen in FIG. 4, the water tank 402 preferably has an open top rather than being an enclosed tank. When the power supply unit 300 is stacked on top of the water tank 402, all or a portion of the water tank 402 may be enclosed on the top side. The water tank 402 and power supply unit 300 are preferably sized so that the units can be stacked as shown in FIG. 7. In this embodiment, the water tank 402 is constructed to support the weight of the power supply unit 300, including the generator 310. Both skids 282 and 284 preferably have lift points so that units 300 and 400 can be moved and stacked using a forklift. The water tank 402 preferably has a water fill line 426 for connecting to a water source to fill the water tank 404 with water before or during cement production and a drain opening 424 for draining water after a cement job is complete. Water may be sourced from a water truck, a municipal water supply, or any other suitable source of water. The water supply unit 400 may optionally have a chiller and heater to provide the capability to change the water temperature without the addition of admixture chemicals and additionally to prevent the water from freezing in cold weather conditions.

In a preferred embodiment, the water supply unit 400 has a platform 422 that extends from the water tank 402 and is utilized for mounting the water pump 404, which supplies water from the water tank 404 to the concrete mixer 206 on the concrete mixing unit 200 through a water supply line 414. Alternatively, the water pump 404 may be installed on the concrete mixing unit 200 or power supply unit 300. The water supply line 414 is preferably a flexible hose used to connect the water supply unit 400 to the concrete mixing unit 200. The pump 404 may be connected to the tank 402 by an inlet water line 418. The water supply line 414 is connected to the water pump 404 outlet and to the water input 290 connection on the concrete mixer 206.

In a preferred embodiment, the system 100 further comprises one or more admixture tanks 406 and an admixture pump 408 configured to transfer admixture chemicals from the admixture tanks 406 into the concrete mixer 206. The admixture tanks 406 are preferably installed on a platform 428 that is mounted onto the top of the water tank 402 of the water supply unit 300, as best seen in FIG. 7. The admixture platform 428 may be installed in a position so that the power supply unit 300 may be stacked on the water tank 402 directly adjacent to the platform 428. FIGS. 2 and 7 show the power supply unit 300 stacked on the water tank 402 without the admixture tanks 406 installed. In this embodiment in which the admixture tanks 406 are installed above the water tank 402, the system 100 preferably includes a containment area for the admixture chemicals to prevent contamination of the water in the water tank 402 below. To contain any admixture chemical spills or leaks, the system 100 preferably comprises a containment tank 410 disposed below the admixture platform that supports the admixture tanks 406. In a preferred embodiment, the containment tank 410 is attached to a bottom side of the admixture platform 428 and extends down into the interior of the water tank 402 as represented by the dashed lines shown in FIG. 7. The admixture platform 428 has a drain 412 at a low point of the platform 428 to drain any spilled or leaked admixture chemicals from the tanks 406 or piping 416, 420 into the containment tank 410. The admixture platform 428 may have a lip 430 around an edge of the platform to ensure that any chemical enters the drain 412 and does not flow over an edge of the platform. The admixture pump 408 may be connected to one or more admixture tanks 406 by inlet admixture piping 420. An admixture supply line 416 is connected to the admixture pump 408 outlet and to the admixture input 292 connection on the concrete mixer 206.

Figure 13:
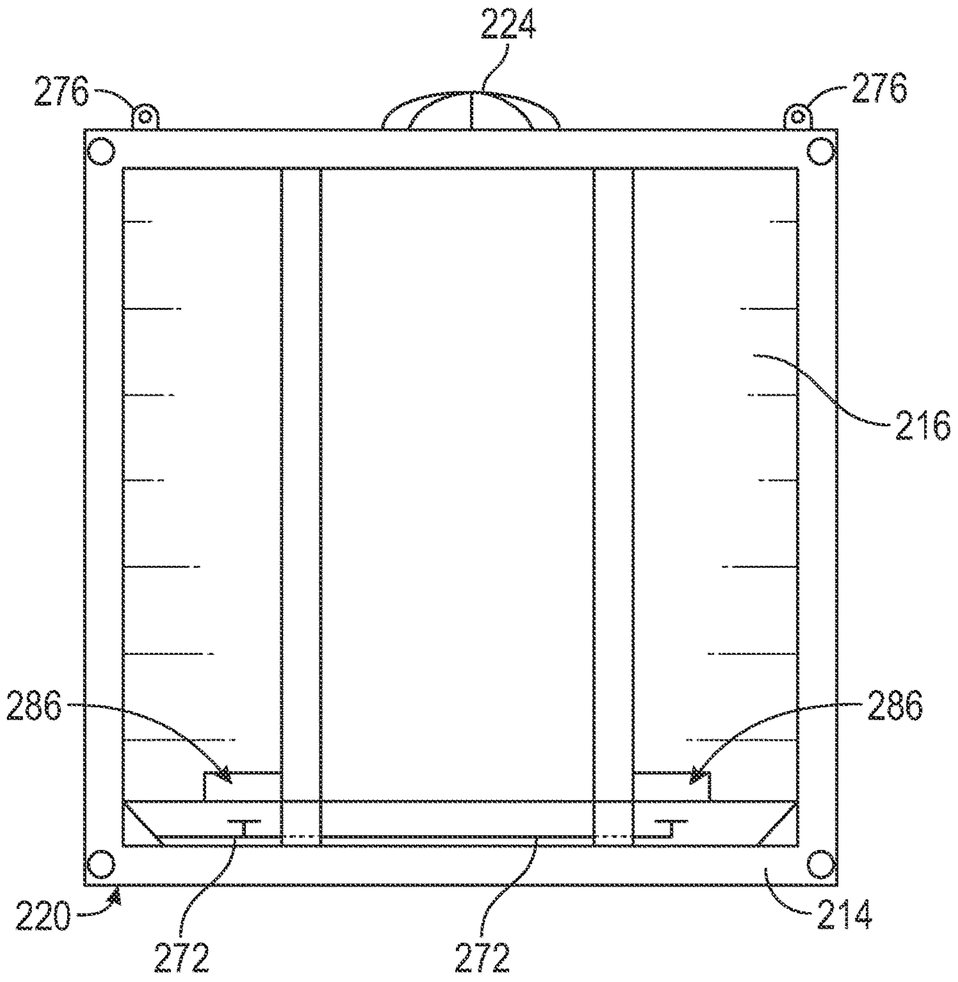
FIG. 13 shows a side view of a storage bin of a modular concrete production system in accordance with the present disclosure.
Figure 14:
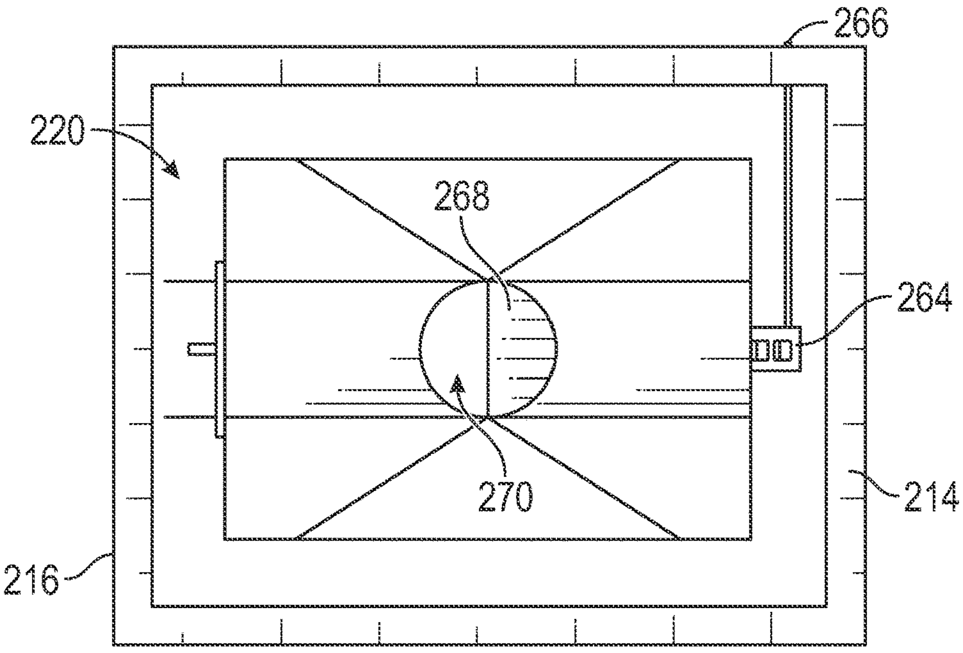
FIG. 14 shows a bottom view of a storage bin of a modular concrete production system in accordance with the present disclosure.

As best seen in FIGS. 3 and 4, the concrete productions system 100 further comprises a plurality of modular bins 216, 236, and 238 that are each designed to be stacked on a top side 244 of the cement hopper 212, on a top side 246 of the stone hopper 240, and on a top side 248 of the sand hopper 242, respectively. FIG. 13 shows a side view of a cement bin 216, and FIG. 14 shows a bottom view of a cement bin 216, which shows a closable gate 268 that may also be utilized with the aggregate bins 236, 238. To limit dust emissions from dry cement, each of the cement bins 216 preferably has an airtight lid 224. The stone bins 236 and sand bins 238 preferably have opposing lids 271 mounted on hinges to open and close the bins. FIGS. 3 and 4 each show a single stone bin 236 with the lids 271 in the open position. Each of the aggregate bins 236 and 238 and the cement bins 216 have a closable gate 268 on the bottom side 220 of the bin. Each bin 216, 236, 238 has a lower bin opening 270 on the bottom side 220 of the bin 216, 236, 238 when the gate 268 is open. As best seen in FIGS. 1 and 6, the lower bin opening 270 of each one of the bins 216, 236, 238 is positioned above the upper hopper opening 244, 246, 248 of its respective hopper 212, 240, 242 when the bin 216, 236, 238 is stacked on the hopper so that the cement or aggregate 258 can be gravity fed from the bin 216, 236, 238 into the hopper positioned directly below the opening 270. In a preferred embodiment, as shown in FIG. 14, each bin 216, 236, 238 comprises a slide gate valve 264 comprising a gate 268 that can be closed to hold the contents within the bin and opened to allow the contents to gravity flow out of the opening 270 on the bottom side 220 of the bin. FIG. 14 shows the gate 268 in a partially closed position. Although FIG. 14 shows a cement bin 216, aggregate bins 236 and 238 may use the same type of valve 264, but may have a larger sized opening 270 suitable for use with aggregate such as sand and stone rather than cement powder. The slide gate valve 264 is preferably a pneumatic valve and has an air connection 266 for connection to a compressed air source for opening and closing the gate 268 of the valve 264. Alternatively, the valve 264 may be hydraulically operated. In other alternative embodiments, other suitable types of gates that can be closed to retain material within the bin and opened to allow material to flow out of the bottom side of the bin may be utilized.

In a preferred embodiment, as shown in FIG. 13, the cement bin 216 may have air fluff lines 272 with nozzles projected into the interior of the bin 216 to intermittently inject compressed air into the cement contained within the interior of the bin 216 in order to ensure that the cement contained within the bin 216 continues to drop downward from the bin 216 into the cement hopper 212 below during operation of the system 100. Each bin 216, 236, 238 preferably also has spaced lift points 286 comprising openings configured to receive opposing forks of a forklift so that the bins may be lifted and placed onto the hoppers using a forklift. In a preferred embodiment, each bin 216, 236, 238 may also comprise a plurality of attachment points 276 on a top side of the bin, as best seen in FIGS. 1, 6, and 13. Preferably, each bin 216, 236, 238 has four attachment points 276 positioned near four corners of the bin, and each attachment point 276 comprises a closed ring with an opening that allows a hook to be secured to the attachment point 276 so that a crane may be used to lift and move the bin. In a preferred embodiment, each attachment point 276 may be set back from an outer edge of the top of the bin to facilitate stacking of the bins on top of each other for storage. Each bin 216, 236, 238 may have a lower frame structure 214 on the bottom side 220 of the bin that extends below the gate 268 and that fits around all four of the attachment points 276 on the top of another bin when one bin is stacked on top of another bin. In this case, the attachment points 276 may prevent a stacked bin from sliding off the top of another bin so that a stacked bin can only be removed by lifting the bin off the lower bin. Alternatively, each bin may optionally include a suitable type of fastening device that can be used to fasten stacked bins to each other to prevent a bin from sliding off the top of another bin. Similar types of fastening devices may also be optionally used to removably secure a bin 216, 236, 238 to one of the hoppers 212, 240, 242 during normal operation of the system 100 to ensure that the bins do not slide when stacked on top of the hoppers, which may occur due to vibration within the concrete mixing unit 200 during normal operation. In a preferred embodiment, each hopper has an outer lip 298 around the perimeter of the hopper to prevent sliding of the bins when stacked on the hopper. An additional fastener may optionally be utilized in combination with the hopper lip 298.

To set up the concrete production system 100 at a work site, each of the individual units 200, 300, 400 are first transported to the site. Each may be transported individually by cargo truck or other suitable types of transportation. Each unit 200, 300, 400 is preferably installed on a portable skid 280, 282, 284, which may be loaded onto and unloaded off of a truck by forklift. Alternatively, a winch or crane may be utilized. The units 200, 300, 400 are then unloaded on-site and placed in a desired location. In a preferred embodiment, as shown in FIGS. 1-4, the power supply unit 300 is stacked onto the top of the water tank 402 of the water supply unit 400, and the stacked units 300 and 400 are placed adjacent to the concrete mixing unit 200 and in close proximity to unit 200. This configuration minimizes the overall footprint that the system 100 occupies at the work site. The water supply unit 400 may first be placed in its desired location, and the power supply unit 300 may then be stacked on the water tank 402 using a forklift. The cement bins 216 and the aggregate bins 236, 238 are also transported to the work site after being pre-filled with cement or an appropriate type of aggregate, respectively. Spare bins of aggregate and cement may also be transported at the beginning or during the job so that bins can be replaced as the contents of bins are depleted. Spare bins may be stored on site, as shown in FIGS. 3 and 4. When the units 200, 300, 400 are placed in the desired location, stairs and walking platforms 316 may optionally be installed to provide access to the units, such as in the configuration shown in FIGS. 2 and 4. In a preferred embodiment, the admixture platform 428 is pre-installed on top of the water tank 402 with the containment tank 410 disposed beneath the platform 428 before transportation to the work site. The admixture tanks 406 and pump 408 may then also be installed on the platform 428. The pump 408 and/or tanks 406 may optionally be pre-installed before transportation to the work site.

Once the individual units 200, 300, 400 have been transported to the work site and are set in place, the power supply unit 300 may be operatively connected to the concrete mixing unit 200 with an electrical power line 312 so that the generator 310 supplies power to the various components of the concrete mixing unit 200 that require electrical power, as illustrated in FIG. 5. In addition, if the water pump 404 is installed on the water supply unit 400, the power supply unit 300 may also be operatively connected to the water supply unit 400 to supply power to the water pump 404 that supplies water to the concrete mixer 206. To power the water pump 404 on the water supply unit 400, an electrical power line 314 may be connected to the generator 310 and to the water pump 404. To power the admixture pump 408, an electrical power line 315 may be connected to the generator 310 and to the admixture pump 408. To power the equipment on the concrete mixing unit 200 that require electrical power, an electrical power line 312 is connected between the generator 310 and the concrete mixing unit 200. As shown in FIG. 5, the concrete mixing unit 200 is preferably configured such that a single power line 312 may be connected to a single connection on the concrete mixing unit 200 to power all equipment on the concrete mixing unit 200. To this end, separate electrical lines may be pre-installed on the concrete mixing unit 200 between each respective piece of equipment requiring electrical power and a connection hub for the electrical power line 312 on the concrete mixing unit 200. Line 312 may also comprise a bundle of lines, which may optionally include communication cables to connect the control system 306 to the concrete mixing unit 200 for controlling equipment installed on the unit 200. Alternatively, communication cables may be installed as separate lines to each piece of equipment or as a bundle of cables connecting the control system 306 of the power supply unit 300 to the concrete mixing unit 200 and/or water supply unit 400.

Next, the concrete mixing unit 200 may be operatively connected to the water supply unit 400, as shown in FIGS. 4 and 5. To connect these units, a water supply line 414 is operatively connected to the water tank 402 of the water supply unit 400 and to the concrete mixer 206 of the concrete mixing unit 200. To connect the water supply line 414, camlock connections or similar quick connection fittings may be used to connect the water supply line 414 to the outlet of the water pump 404 and to a water input connection fitting 290 on the concrete mixer 206. Once connected, the water pump 404 may be used to supply water from the water tank 402 to the concrete mixer 206. The concrete mixing unit 200 may also be operatively connected to the admixture tanks 406, as shown in FIGS. 4 and 5. To facilitate this connection, an admixture supply line 416 may be operatively connected to the admixture tanks 406 and to the concrete mixer 206 of the concrete mixing unit 200. To connect the admixture supply line 416, camlock connections or similar quick connection fittings may be used to connect the admixture supply line 416 to the outlet of the admixture pump 408 and to an admixture input connection fitting 292 on the concrete mixer 206. Once connected, the admixture pump 408 may be used to supply admixture chemicals from the admixture tanks 406 to the concrete mixer 206.

Once all of these connections between units are complete, the system 100 is ready for on-site concrete production. Thus, all of the units 200, 300, 400 may be operatively connected to each other through electrical power connections 312, 314, 315 and supply lines 414, 416 for conveying water and admixture chemicals into the concrete mixer 206. No major operational components of the system 100 need to be separately moved or assembled on-site. Only the skids 280, 282, 284 on which such components are mounted need to be transported. The final step for set up of the system 100 is to stack the cement bin 216 onto the cement hopper 212 and stack the aggregate bins 236, 238 onto the aggregate hoppers 240, 242 to supply cement and aggregate 258 to the concrete mixer 206. The gate valve 264 may be used to open the gate 268 on each of the bins 216, 236, 238 to supply cement from the cement bin 216 into the cement hopper 212 and to supply aggregate 258 from the aggregate bins 236, 238 into the aggregate hoppers 240, 242. When the gates 268 on each of the bins 216, 236, 238 are opened, then the contents of each bin can gravity flow down into the hoppers positioned below the bins stacked thereon. The aggregate 258 may then drop through the opening 250 in each of the aggregate hoppers 240, 242 and onto conveyor belts 252 and 254. In addition, the cement may drop though the opening 250 in the cement hopper 212 and be funneled by the funneling section 222 of hopper 212 into the cement auger 210 housing.

Once all of the set-up steps are completed, cement production may begin by supplying water from the water tank 402, cement from the cement bin 216 through the cement hopper 212, and aggregate from the aggregate bins 236, 238 through the aggregate hoppers 240, 242 into the concrete mixer 206. These raw materials may be input into the mixer 206 by the water pump 404, the cement auger 210, and the aggregate conveyors 252, 254, respectively. Admixture chemicals may optionally be input into the concrete mixer 206 from one or more admixture tanks 406 using the admixture pump 408 along with the water, cement, and aggregate. These individual raw materials may be continuously added into the concrete mixer 206 where they may be continuously and homogenously mixed to form a wet concrete slurry. The mixing auger 208 may be utilized to mix the ingredients through the rotating action of the auger 208 to form a homogenous slurry mixture. As the raw materials are continuously input into the mixer 206, the homogenous wet concrete slurry may then be continuously conveyed by the auger 208 to the discharge point 226 so that concrete slurry may be output by the unit 200 continuously. The rate of discharge may be controlled by adjusting the speed of rotation of the auger 208.

The system 100 may be operated by as few as two operators. One operator may generally be stationed in the main control room 302 to constantly monitor the operation and make any adjustments as needed. The operator may control concrete production by the system 100 using the control panel 308 of the control system 306. A second operator may operate a forklift to change out the cement bin 216 and aggregate bins 236, 238 when the content of any of the bins become depleted in order to maintain a continuous supply of cement and aggregate 258 into the concrete mixer 206. The present modular system 100 provides for reduced set-up time and thus a quick start-up for on-site concrete production. The present system 100 may also provide environmental benefits by reducing dust emissions from cement and aggregate handling due to these components being pre-loaded into bins that are transported to a site and then hauled away after use.

It is understood that versions of the present disclosure may come in different forms and embodiments. Additionally, it is understood that one of skill in the art would appreciate these various forms and embodiments as falling within the scope of the invention as disclosed herein.

What is claimed is:

1. A modular concrete production system, comprising:

a portable concrete mixing unit comprising a concrete mixer, a cement hopper having an upper cement hopper opening, and an aggregate hopper having an upper aggregate hopper opening;

a cement bin having a closable cement gate on a bottom side of the cement bin, wherein the cement bin is designed to be stacked on a top side of the cement hopper, wherein the cement hopper comprises a cement bin support structure upon which the cement bin rests when the cement bin is stacked on the top side of the cement hopper, wherein the cement hopper further comprises a cement hopper rim that extends upwardly from the cement bin support structure, wherein the cement bin is sized to fit within a boundary defined by the cement hopper rim when the cement bin is stacked on the top side of the cement hopper;

an aggregate bin having a closable aggregate gate on a bottom side of the aggregate bin, wherein the aggregate bin is designed to be stacked on a top side of the aggregate hopper, wherein the aggregate hopper comprises an aggregate bin support structure upon which the aggregate bin rests when the aggregate bin is stacked on the top side of the aggregate hopper, wherein the aggregate hopper further comprises an aggregate hopper rim that extends upwardly from the aggregate bin support structure, wherein the aggregate bin is sized to fit within a boundary defined by the aggregate hopper rim when the aggregate bin is stacked on the top side of the aggregate hopper;

a portable power supply unit comprising a generator; and a portable water supply unit comprising a water tank;

wherein the concrete mixer has an input for cement from the cement hopper, an input for aggregate from the aggregate hopper, and an input for water, wherein the power supply unit is operatively connected to the concrete mixing unit such that the generator supplies power to the concrete mixing unit, and wherein the system further comprises a water supply line connecting the water tank of the water supply unit to the concrete mixer of the concrete mixing unit for supplying water to the concrete mixer.

2. The system of claim 1, wherein the cement bin has a lower cement bin opening on the bottom side of the cement bin when the cement gate is opened, wherein the lower cement bin opening is positioned above the upper cement hopper opening when the cement bin is stacked on the cement hopper such that cement can be gravity fed from the cement bin into the cement hopper, and wherein the aggregate bin has a lower aggregate bin opening on the bottom side of the aggregate bin when the aggregate gate is opened, wherein the lower aggregate bin opening is positioned above the upper aggregate hopper opening when the aggregate bin is stacked on the aggregate hopper such that aggregate can be gravity fed from the aggregate bin into the aggregate hopper.

3. The system of claim 1, wherein the concrete mixer comprises a mixing auger configured to convey concrete slurry from the concrete mixer to a discharge point.

4. The system of claim 1, wherein the concrete mixing unit further comprises a cement auger configured to convey cement from the cement hopper into the concrete mixer.

5. The system of claim 1, wherein the concrete mixing unit comprises a conveyor configured to transfer aggregate from the aggregate hopper into the concrete mixer.

6. The system of claim 1, wherein the concrete mixing unit is mounted on a first portable skid, wherein the power supply unit is mounted on a second portable skid, and wherein the water supply unit is mounted on a third portable skid.

7. The system of claim 6, wherein the second portable skid is designed to be stacked on a top side of the water tank of the water supply unit.

8. The system of claim 1, wherein the power supply unit further comprises a control room housing a control system configured to control input of cement, aggregate, and water into the concrete mixer.

9. The system of claim 1, further comprising an admixture tank and an admixture pump configured to transfer an admixture chemical from the admixture tank into the concrete mixer.

10. A method of producing concrete, said method comprising the steps of:

providing a modular concrete production system, comprising:

a portable concrete mixing unit comprising a concrete mixer, a cement hopper having an upper cement hopper opening, and an aggregate hopper having an upper aggregate hopper opening, a cement bin having a closable cement gate on a bottom side of the cement bin, wherein the cement bin is designed to be stacked on a top side of the cement hopper, wherein the cement hopper has a cement bin support structure upon which the cement bin rests when the cement bin is stacked on the top side of the cement hopper, wherein the cement hopper also has a cement hopper rim that extends upwardly from the cement bin support structure, wherein the cement bin is sized to fit within a boundary defined by the cement hopper rim when the cement bin is stacked on the top side of the cement hopper, an aggregate bin having a closable aggregate gate on a bottom side of the aggregate bin, wherein the aggregate bin is designed to be stacked on a top side of the aggregate hopper, wherein the aggregate hopper has an aggregate bin support structure upon which the aggregate bin rests when the aggregate bin is stacked on the top side of the aggregate hopper, wherein the aggregate hopper also has an aggregate hopper rim that extends upwardly from the aggregate bin support structure, wherein the aggregate bin is sized to fit within a boundary defined by the aggregate hopper rim when the aggregate bin is stacked on the top side of the aggregate hopper, a portable power supply unit comprising a generator, and a portable water supply unit comprising a water tank, wherein the concrete mixer has an input for cement from the cement hopper, an input for aggregate from the aggregate hopper, and an input for water;

operatively connecting the power supply unit to the concrete mixing unit such that the generator supplies power to the concrete mixing unit;

connecting a water supply line to the water tank of the water supply unit and to the concrete mixer of the concrete mixing unit such that the water tank supplies water to the concrete mixer;

stacking the cement bin on the cement hopper and opening the cement gate to supply cement from the cement bin into the cement hopper;

stacking the aggregate bin on the aggregate hopper and opening the aggregate gate to supply aggregate from the aggregate bin into the aggregate hopper;

inputting water from the water tank, cement from the cement hopper, and aggregate from the aggregate hopper into the concrete mixer; and continuously mixing the water, cement, and aggregate in the concrete mixer to form concrete slurry.

11. The method of claim 10, wherein the cement bin has a lower cement bin opening on the bottom side of the cement bin when the cement gate is opened, wherein the lower cement bin opening is positioned above the upper cement hopper opening when the cement bin is stacked on the cement hopper such that cement can be gravity fed from the cement bin into the cement hopper, and wherein the aggregate bin has a lower aggregate bin opening on the bottom side of the aggregate bin when the aggregate gate is opened, wherein the lower aggregate bin opening is positioned above the upper aggregate hopper opening when the aggregate bin is stacked on the aggregate hopper such that aggregate can be gravity fed from the aggregate bin into the aggregate hopper.

12. The method of claim 10, wherein the cement bin is filled with cement at an off-site cement filling location before transporting the cement bin to an on-site location and stacking the cement bin on the cement hopper, wherein the cement bin is replaced by a second cement bin when the cement is depleted from the first cement bin, and wherein the aggregate bin is filled with aggregate at an off-site aggregate filling location before transporting the aggregate bin to the on-site location and stacking the aggregate bin on the aggregate hopper, wherein the aggregate bin is replaced by a second aggregate bin when the aggregate is depleted from the first aggregate bin.

13. The method of claim 10, wherein the concrete mixer comprises a mixing auger, wherein the step of continuously mixing the water, cement, and aggregate in the concrete mixer to form the concrete slurry comprises using the mixing auger to continuously mix the water, cement, and aggregate, wherein the method further comprises the step of using the mixing auger to convey the concrete slurry from the concrete mixer to a discharge point.

14. The method of claim 10, wherein the concrete mixing unit further comprises a cement auger configured to convey cement from the cement hopper into the concrete mixer, wherein the step of inputting cement from the cement hopper into the concrete mixer comprises using the cement auger to input cement into the concrete mixer.

15. The method of claim 10, wherein the concrete mixing unit further comprises a conveyor configured to transfer aggregate from the aggregate hopper into the concrete mixer, wherein the step of inputting aggregate from the aggregate hopper into the concrete mixer comprises using the conveyor to input aggregate into the concrete mixer.

16. The method of claim 10, wherein the power supply unit further comprises a control room housing a control system configured to control input of cement, aggregate, and water into the concrete mixer.

17. The method of claim 10, wherein the system further comprises an admixture tank and an admixture pump configured to transfer an admixture chemical from the admixture tank into the concrete mixer, wherein the method further comprises the step of transferring the admixture chemical from the admixture tank into the concrete mixer with the water, cement, and aggregate.

18. A method of producing concrete, said method comprising the steps of:

providing a modular concrete production system, comprising:

a portable concrete mixing unit comprising a concrete mixer, a cement hopper having an upper cement hopper opening, and an aggregate hopper having an upper aggregate hopper opening, a cement bin having a closable cement gate on a bottom side of the cement bin, wherein the cement bin is designed to be stacked on a top side of the cement hopper, an aggregate bin having a closable aggregate gate on a bottom side of the aggregate bin, wherein the aggregate bin is designed to be stacked on a top side of the aggregate hopper, a portable power supply unit comprising a generator, and a portable water supply unit comprising a water tank, wherein the concrete mixer has an input for cement from the cement hopper, an input for aggregate from the aggregate hopper, and an input for water, wherein the concrete mixing unit is mounted on a first portable skid, wherein the power supply unit is mounted on a second portable skid, and wherein the water supply unit is mounted on a third portable skid, wherein the second portable skid is designed to be stacked on a top side of the water tank of the water supply unit;

stacking the second portable skid on a top side of the water tank;

operatively connecting the power supply unit to the concrete mixing unit such that the generator supplies power to the concrete mixing unit;

connecting a water supply line to the water tank of the water supply unit and to the concrete mixer of the concrete mixing unit such that the water tank supplies water to the concrete mixer;

stacking the cement bin on the cement hopper and opening the cement gate to supply cement from the cement bin into the cement hopper;

stacking the aggregate bin on the aggregate hopper and opening the aggregate gate to supply aggregate from the aggregate bin into the aggregate hopper;

inputting water from the water tank, cement from the cement hopper, and aggregate from the aggregate hopper into the concrete mixer; and continuously mixing the water, cement, and aggregate in the concrete mixer to form concrete slurry.

* * * * *